March 15, 1949. G. R. TREMOLADA 2,464,469
HYDRAULIC BRAKE WITH AUXILIARY SAFETY DEVICE
Filed March 26, 1945 3 Sheets-Sheet 1
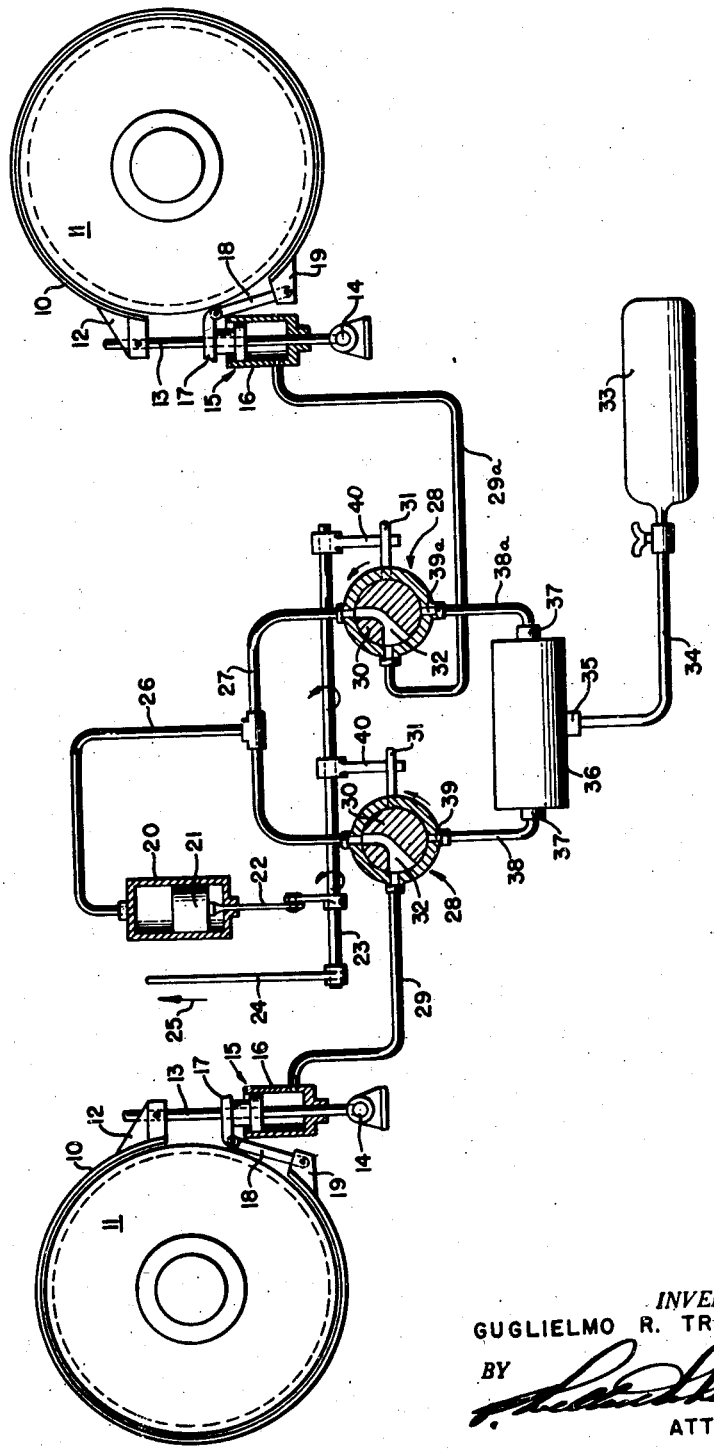
Fig. 1
INVENTOR.
GUGLIELMO R. TREMOLADA
BY
ATTORNEY March 15, 1949.    G. R. TREMOLADA    2,464,469
HYDRAULIC BRAKE WITH AUXILIARY SAFETY DEVICE
Filed March 26, 1945    3 Sheets-Sheet 2

INVENTOR.
GUGLIELMO R. TREMOLADA
BY
ATTORNEY

March 15, 1949.  G. R. TREMOLADA  2,464,469
HYDRAULIC BRAKE WITH AUXILIARY SAFETY DEVICE
Filed March 26, 1945  3 Sheets-Sheet 3
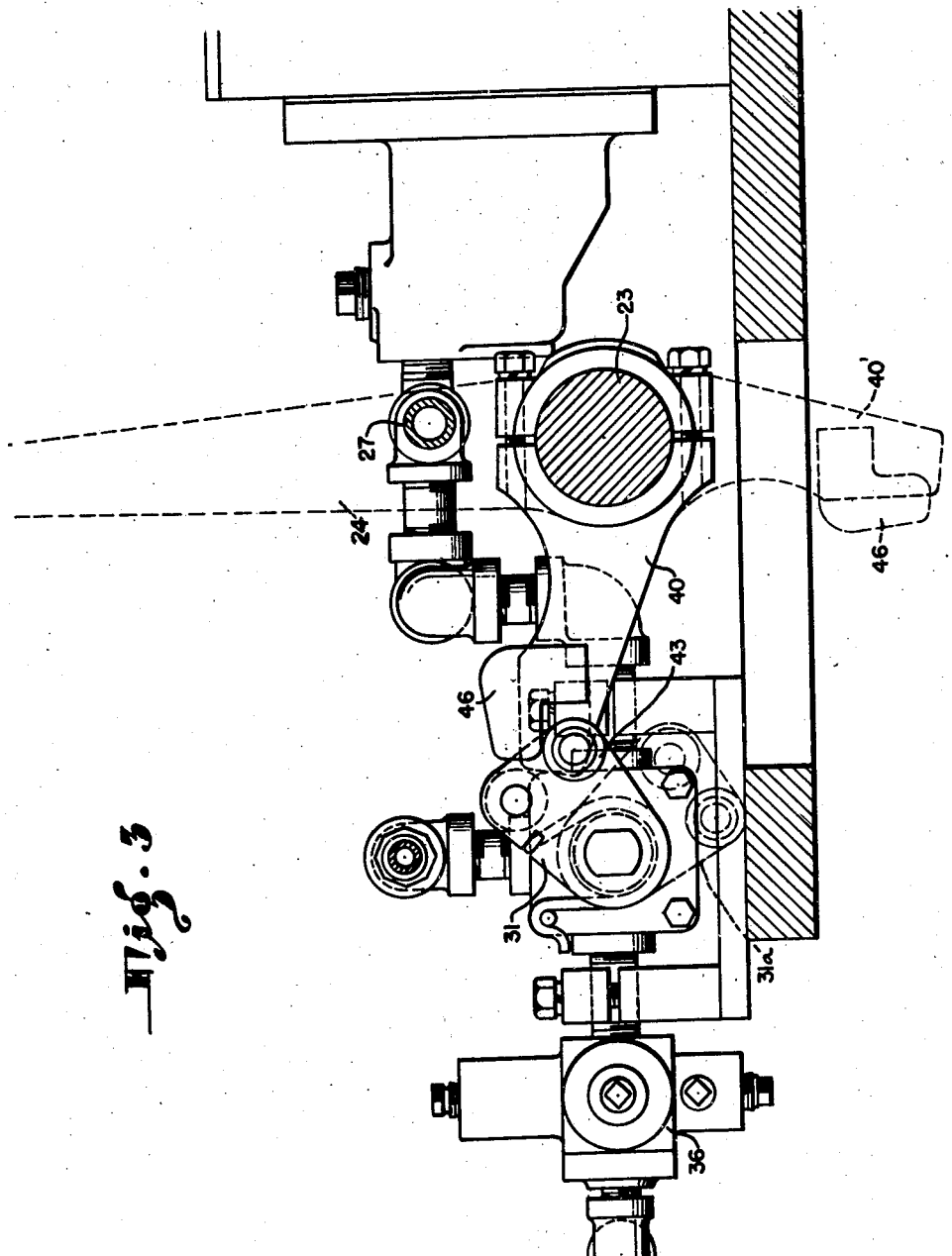
Fig. 3
INVENTOR.
GUGLIEMO R. TREMOLADA
BY 
ATTORNEY Patented Mar. 15, 1949

2,464,469

UNITED STATES PATENT OFFICE 2,464,469

HYDRAULIC BRAKE WITH AUXILIARY SAFETY DEVICE

Guglielmo R. Tremolada, Los Angeles, Calif., assignor to Emsco Derrick & Equipment Company, Los Angeles, Calif., a corporation of California Application March 26, 1945, Serial No. 584,777

16 Claims. (Cl. 188—151)

My invention relates in general to hydraulic brakes and relates in particular to heavy duty hydraulic brakes such as employed in connection with hoisting drums such as used in the drawworks of well drilling equipment.

In heavy duty hoisting equipment of this character it is customary to employ a pair of brakes, one at each end of the hoisting drum. These brakes are large in diameter and either one of the brakes is capable of stopping and holding the drum against the maximum torque which might be applied. Although the foregoing is true, the brakes are used in multiple for the reason that they are subject to heavy wear or severe usage and the working life of the brakes is extended by distributing the load between several brakes. In my present invention I employ a pair of brakes which are tightened by force derived from hydraulic cylinders, as disclosed in my issued Patent No. 2,331,517, granted October 12, 1943. The hydraulic cylinders associated with the separate brakes receive fluid under pressure from a master cylinder which is actuated by a hand lever operated by the driller. The equalization of pressure applied to the brakes through a hydraulic system of this character provides ease and accuracy of control of the brakes and results in maximum usefulness of the brake bands as the result of the substantially equalized distribution of the wear between the brake bands. It is an object of my present invention to provide a hydraulic brake of the character set forth in the foregoing having a safety means which will assure operation of the brakes in event of failure of the hydraulic system.

It is an object of the invention to provide a hydraulic brake system having a separate fluid pressure potential which is automatically directed into one or more of the brake cylinders in event of failure of the normally used hydraulic system of the brakes.

A further object of the invention is to provide a dual hydraulic brake system of the character referred to herein having a separate source of fluid potential and means for directing fluid under pressure from this fluid potential into the cylinder associated with one of the brake bands in event of breakage or failure of the hydraulic conduit leading to the remaining brake cylinder. Accordingly, should a pressure conduit leading to one of the brake cylinders be ruptured so as to lose the pressure in the hydraulic system associated with both of the brakes, my invention will operate to isolate or shut off the ruptured conduit and then deliver fluid under pressure through the remaining unbroken conduit to the cylinder which is fed through this remaining conduit.

It is a further object of the invention to provide a hydraulic braking system having a master cylinder which is connected to delivery conduits through a pair of three way valves, these delivery conduits extending respectively to the hydraulic cylinders employed for actuation of the brake bands. A source of potential fluid pressure—such, for example, as a tank of oxygen under pressure—is connected to both of the three-way valves, so that by actuation of these three-way valves, the delivery conduits will be cut off from connection with the master cylinder and will be connected to the source of fluid pressure so that pressure from this source will be then delivered through the delivery conduits to the hydraulic cylinders to actuate the same.

A further object of the invention is to provide a brake system of the character described in the preceding paragraph, wherein the auxiliary pressure may be applied and released, at the will of the operator, thereby giving a control of the brakes similar to normal control. One of the advantages of this arrangement is that should there be a failure of the hydraulic brake system while a string of pipe is in the well, the auxiliary pressure system of the brakes can be used during the time the string of pipe is removed from the well.

A further object of the invention is to provide a simple and effective valve operating mechanism for the three-way transfer valves of the auxiliary pressure fluid control, automatically actuated when the hand lever of the hydraulic brake system reaches and/or passes beyond a prescribed position near the end of its possible travel.

Further objects and advantages of the invention will be brought out in the following part of the specification.

Referring to the drawings which are for illustrative purposes only,

Fig. 1 is a diagrammatic view showing a preferred form of my invention.

Fig. 3 is a side view of Fig. 2 taken from the postion of the arrow 3 of Fig. 2.

Figure 2:
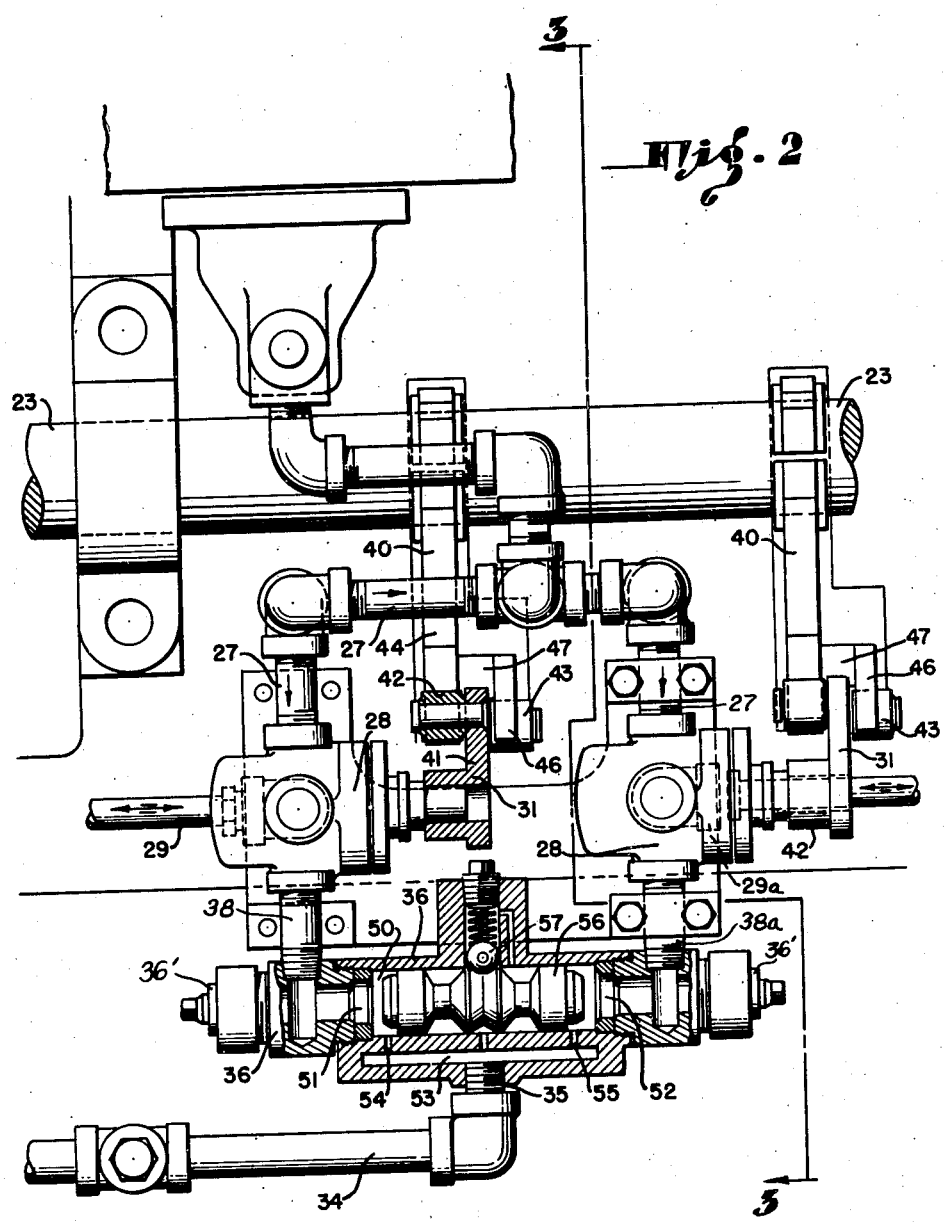
Fig. 2 is a plan view, to enlarged scale, showing the valve mechanism of the invention.

In Fig. 1 I show a pair of brake bands 10 respectively surrounding right and left hand brake drums 11. The dead ends 12 of the brake bands 10 are connected to the upper ends of slide rods 13, the lower ends of which rods 13 are supported by pivots 14. On each bar 13 there is a hydraulic cylinder device 15 having a stationary cylinder 16 and a movable piston 17 which surrounds the bar 13 and slides upwardly thereon when fluid under pressure is directed into the cylinder 16. The piston 17 is connected by a link 18 with the movable end 19 of the brake band 10 so as to tighten the brake band around the associated drum 11.

The brake system has a master cylinder 20 provided with a piston 21 connected through linkage and lever means 22 with a brake operating shaft 23 having thereon a handle or lever 24 whereby the shaft 23 may be rotated for the purpose of actuating the brakes. When the brake lever 24 is moved forward, as indicated by the arrow 25, in Fig. 1, the linkage 22 will move the piston 21 in the cylinder 20 and hydraulic fluid will be forced under pressure through a conduit 26 and branch conduits 27 to transfer valves 28 which are connected through conduits 29 and 29a respectively with the left hand and right hand hydraulic cylinder devices 15. The transfer valves 28 are shown as being of the three-way type, and each of these valves 28 has a valve body 30 adapted to be rotated by a projecting handle 31. The valve bodies 30 have passages or ports 32 therein which connect the conduits 27 with the conduits 29 and 29a when the bodies 30 are in the positions shown in Fig. 1. Accordingly, fluid pressure from the master cylinder 20 may be transmitted through the associated conduits 26, 27, 29, and 29a and the valve passages 32 to both of the hydraulic cylinder devices 15, whereupon the brake bands 10 will be tightened around the drums 11.

A fluid pressure potential is provided. Although this source of fluid pressure may comprise a steam boiler or other chamber in which fluid is held under pressure, I prefer to use an oxygen bottle 33 which is connected through a conduit 34 with the inlet 35 of an automatic selector valve 36. The selector valve 36 has right hand and left hand outlets 37, which are respectively connected through conduits 38 and 38a, which conduits extend separately to the ports 39 and 39a in the casings of the transfer valves 28. When the valve bodies 30 are in the positions shown in Fig. 1, the ports 39 and 39a are blocked thereby and no flow of fluid pressure from the conduits 38 and 38a may occur.

On the operating shaft 23 there are valve actuating levers 40 positioned so that they may engage the levers 31 of the valves 28. These actuating levers 40 are positioned on the shaft 23 so as to project downwardly as shown by dotted lines 40' in Fig. 3 when the lever 24 is erect, so that during the normal operation of the brake they will not engage the levers 31. The levers 40 are so positioned that they will engage the levers 31 only when the brake lever 24 reaches a predetermined position near the end of its movement, that is to say, when the lever 24 is swung in clockwise direction from the position in which it is shown in Fig. 3, to near horizontal position. This position is never reached by the brake lever 24 during the normal operation of the hydraulic brake system for the reason that the fluid pressure delivered by the master cylinder 20 will actuate the brakes prior to the time the handle 24 reaches this prescribed position. Should there be a loss of hydraulic fluid from the master cylinder 20 and the hydraulic system associated therewith which would result in the normal hydraulic operation of the brakes, and would of course permit the brake lever 24 to be moved into and through the hereinbefore prescribed position for the engagement of the actuating levers 40 with the valve lever 31, the levers 40 will engage and move the lever 31, thereby rotating the valve bodies 30 in counterclockwise direction, Fig. 1, so as to bring the valve passages 32 into positions connecting the ports 39 and 39a with the conduits 29 and 29a, whereupon fluid under pressure will flow from the pressure source 33 through the conduits 29 and 29a to the cylinders 16 of the hydraulic devices 15, thereby moving the pistons 17 so as to actuate the brakes. It will be understood that at this time the valve bodies 30 will close off the ends of the conduits 27 which communicate with the transfer valves 28.

In Figs. 2 and 3 I show the brake operating shaft 23 with the valve actuating levers 40 thereon in positions to engage the valve levers 31 in their normal positions of extension from the transfer valves 28. The conduits 27 are shown in their respective relations to the valves 28 and the details of construction of the automatic selector valve 36 is also shown. Each valve lever 31 consists of a radial wall 41 supporting an upper roller 42 which extends leftward and a lower roller 43 which extends rightward. Each lever 40 has a lever arm 44 positioned so that as the lever 40 swings upward, its end portion will engage the lower side of the upper roller 42 and will swing the lever 31 upward from the dotted line position 31a thereof, Fig. 3, into the position in which the lever 31 is shown in full lines. Each lever 40 has a projecting finger 46 in offset relation and positioned so as to lie above the lower roller 43 as the lever 31 swings upwardly toward its raised position shown in full lines, there being a space 47 between the end of the lever 40 and the finger 46 in which the plate 41 of the lever 40 may swing. The finger 46, accordingly, is now positioned above the roller 43 as shown in Fig. 3 so that when the lever 40 swings downward from the position in which it is shown in Fig. 3, this finger 46 will engage the roller 43 forcing the same downward to rotate the lever 31 into its initial position, shown by dotted lines 31', wherein the body 30 of the valve device 28 will be positioned as shown in Fig. 1 and the valve passage 32 will be returned to its initial position.

The automatic selector valve 36 has a cylindric bore 50 with valve ports 51 and 52 at the opposite ends thereof which communicate respectively with the conduits 38 and 38a. Along the front side thereof the selector valve 36 has a passage 53 which communicates with the bore 50 through relatively small ports 54 and 55. This passage 53 has the inlet 35 communicating therewith, such inlet 35 being connected to the conduit 34 so as to receive fluid under pressure from the fluid source 33. A valve piston 56 is slidable in the bore 50 and is normally maintained in centralized position between the ports 54 and 55 by a spring pressed detent ball 57. The ends of the piston 56 are formed so as to provide valves for closing the ports 51 and 52. When the pressure against the opposite ends of the valve piston 56 are unbalanced to a sufficient extent to overcome the restraining effect of the detent ball 57, the valve piston 56 will be shifted axially from the centralized position in which it is shown, thereby closing one of the ports 51 or 52. The ends of the housing of the selector valve 36 are provided with plugs 36' which may be removed so that a bar may be inserted to shift the valve piston back into centralized position after it has been shifted laterally.

The manner in which the automatic selector valve 36 cooperates with the rest of the mechanism will be perceived from the following explanation of one utility of the invention. Let it be supposed, for example, that the conduit 29a has become ruptured so that there will be an immediate loss of hydraulic fluid from the hydraulic lines which are fed by the cylinder 20. This will permit the handle 24 to rotate forwardly to the end of its range of movement, and the levers 40 will be swung from the dotted line positions 40' thereof into the positions in which they are shown in full lines in Fig. 3, the levers 40 by this movement rotating the valve levers 31 upward into the raised positions in which they are shown in Fig. 3, thereby rotating the valve bodies 30 so as to bring the passages 32 into positions wherein the conduit 38 will be connected to the conduit 29, and the conduit 38a will be connected with the conduit 29a. This will result in a flow of fluid from the container 33 through the ports 54 and 55 of the selector valve 36, which flow will continue through the ports 51 and 52 and the conduits 38 and 38a. Since the conduit 29a, which is at this time connected to the conduit 38a, has been ruptured, there will be no build up of pressure in the port 52 of the selector valve 36, to resist the pressure build up which occurs in the port 51 of the selector valve 36, and in the space lying adjacent the leftward end of the piston valve 56. The greater pressure applied to the leftward end of the piston valve 56 as compared to the pressure at the rightward end thereof will result in a shifting of the piston 56 rightwardly so as to close the port 55 and the port 52. There will then be no flow of fluid pressure from the container 33 to the ruptured conduit 29a, and the pressure which now passes through the selector valve 36 and the leftward transfer valve 28, Figs. 1 and 2, into the conduit 29 will actuate the left hand brake cylinder 15, Fig. 1, and thereby constrict the associated brake band 10 around the left hand brake drum 11 to bring the cable spool to a stop.

The left hand brake, which has been actuated as explained in the preceding paragraph, may be released and reapplied a number of consecutive times, this number depending upon the volume of fluid maintained in the container 33. Should the operator desire to release the left hand brake so as to permit rotation of the cable spool, he will lift upon the operating lever 24, thereby rotating the actuating levers 40 downward from the positions in which they are shown in Fig. 3, such movement of the levers 40 producing a downward rotation of the levers 31 so as to rotate the valve bodies 30, Fig. 1, back into the positions in which they are shown in this figure. This will connect the conduit 29 with the conduits 27, which are now connected through the right hand valve 28 with the conduit 29a, so that fluid under pressure may flow from the left hand hydraulic cylinder 15 to the ruptured conduit 29a and escape to the exterior through the rupture therein. The release of fluid pressure from the left hand hydraulic cylinder 15 will result in release of the left hand brake. During this release of pressure there will be no escape of fluid pressure from the container 33 for the reason that the valve bodies 30 will close the ports 39 and 39a. Reapplication of the left hand brake may be accomplished by again moving the operating lever 24 into its extreme position, raising the actuating levers 40 and rotating the valve levers 31 upward toward the position indicated by full lines in Fig. 3, to rotate the valve bodies 30 again into positions wherein the passages 32 will connect the ports 39 and 39a respectively with the ports 29 and 29a, whereupon fluid pressure will again flow from the conduit 38 through the left hand transfer valve 28 to the conduit 29.

I claim as my invention:

1. In a hydraulic brake, the combination of: a brake cylinder; a master cylinder; a movable member connected to said master cylinder so as to actuate the same, said member, during the normal operation of the brake, being moved directly against the reaction of the fluid pressure in said master cylinder and being movable from a starting position through an operating position to an end position; conduit means connecting said master cylinder with said brake cylinder; a source of fluid pressure; and means automatically operating to disconnect said brake cylinder with respect to the master cylinder and connect it to said source of fluid pressure when said movable member is moved beyond said operating position.

2. In a hydraulic brake, the combination of: a brake cylinder; a master cylinder; a movable member connected to said master cylinder so as to actuate the same, said member being movable from a starting position through a prescribed position to an end position; a three-way valve having first, second, and third ports and a valve body for connecting said first and second ports when said valve body is in its first position or connecting said second and third ports when said valve body is in its second position; a source of fluid under pressure; conduit means connecting said master cylinder to said first port; conduit means connecting said second port to said brake cylinder; conduit means connecting said source of fluid under pressure to said third port; and means providing an operative connection between said movable member and said valve body whereby said valve body will be moved from its first position into its second position when said movable member is moved into said end position thereof.

3. In a hydraulic brake, the combination of: a brake cylinder; a master cylinder; a movable member connected to said master cylinder so as to actuate the same, said member being movable from a starting position through a prescribed position to an end position; a three-way valve having first, second, and third ports and a valve body for connecting said first and second ports when said valve body is in its first position or connecting said second and third ports when said valve body is in its second position; a source of fluid under pressure; conduit means connecting said master cylinder to said first port; conduit means connecting said second port to said brake cylinder; conduit means connecting said source of fluid under pressure to said third port; and means providing an operative connection between said movable member and said valve body whereby said valve body will be moved back and forth between second and first positions as said movable member is moved back and forth between its starting and end positions.

4. In a hydraulic brake, the combination of: a master cylinder; a pair of brake cylinders; a movable member connected to said master cylinder so as to actuate the same, said movable member, during the normal operation of the brake, being moved directly against the reaction of the fluid pressure in said master cylinder and being movable from a starting position to an end position; conduit means connecting said master cylinder with said brake cylinders; a source of fluid under pressure; and means operating automatically to disconnect the master cylinder with respect to said brake cylinder and connect said source of fluid under pressure to said conduit means in response to movement of said movable member into said end position thereof.

5. In a hydraulic brake, the combination of: a master cylinder; a pair of brake cylinders; a movable member connected to said master cylinder so as to actuate the same, said movable member being movable from a starting position to an end position; a pair of three-way valves, each having a first port, a second port and a third port and a valve body for connecting said first and second ports when said body is in its first position and connecting said second and third ports when said body is in its second position; ducts connecting said master cylinder with said first ports; conduits connecting said second ports with said brake cylinder; a source of fluid under pressure; duct means connecting said source of fluid under pressure to said third ports; and means providing operative connection between said movable member and said valve bodies whereby said valve bodies will be moved from said first positions to said second positions thereof when said movable member is moved into its end position.

6. In a hydraulic brake, the combination of: a master cylinder; a pair of brake cylinders; a movable member connected to said master cylinder so as to actuate the same, said movable member being movable from a starting position to an end position; a pair of three-way valves, each having a first port, a second port and a third port and a valve body for connecting first and second ports when said body is in its first position and connecting said second and third ports when said body is in its second position; ducts connecting said master cylinder with said first ports; conduits connecting said second ports with said brake cylinder; a source of fluid under pressure; duct means connecting said source of fluid under pressure to said third ports; means providing operative connection between said movable member and said valve bodies whereby said valve bodies will be moved from said first positions to said second positions thereof when said movable member is moved into its end position; and means operating automatically in response to rupture of one of said conduits to cut off the flow of fluid thereinto from said source of fluid under pressure when said valve bodies are moved into the second positions thereof.

7. In a hydraulic brake, the combination of: a master cylinder; a pair of brake cylinders; a movable member connected to said master cylinder so as to actuate the same, said movable member being movable from a starting position to an end position; a pair of three-way valves, each having a first port, a second port and a third port and a valve body for connecting first and second ports when said body is in its first position and connecting said second and third ports when said body is in its second position; ducts connecting said master cylinder with said first ports; conduits connecting said second ports with said brake cylinder; a source of fluid under pressure; an automatic selector valve having an inlet port and a pair of outlet ports normally connected to said inlet port, and valve means operating automatically in response to a prescribed pressure differential between said outlet ports to close the outlet port in which the lower pressure exists; and duct means connecting said outlet ports respectively with said third ports of said three-way valves.

8. In a hydraulic brake, the combination of: a brake cylinder; a master cylinder; a movable member connected to said master cylinder so as to actuate the same, said member being movable from a starting position through a prescribed position to an end position; a three-way valve having first, second, and third ports and a valve body for connecting said first and second ports when said valve body is in its first position or connecting said second and third ports when said valve body is in its second position; an operating member connected to said valve body for moving the same; a source of fluid under pressure; conduit means connecting said master cylinder to said first port; conduit means connecting said second port to said brake cylinder; conduit means connecting said source of fluid under pressure to said third port; and an actuating member moved back and forth by said movable member, adapted to engage and move said operating member when said movable member moves into said end position, whereby said valve body will be moved from its first position into its second position as said movable member is moved into its end position.

9. In a hydraulic brake, the combination of: a pair of brake cylinders; a master cylinder; a movable member connected to said master cylinder so as to actuate the same, said member, during the normal operation of the brake, being moved directly against the reaction of the fluid pressure in said master cylinder and being movable from a starting position through a prescribed position to an end position; a pair of conduit means connecting said master cylinder with said brake cylinders; a source of fluid pressure; means automatically operating to connect said source of fluid pressure to said brake cylinders when said movable member is moved into said end position; and means operating automatically in response to rupture of one of said conduit means to cut off the flow of the fluid thereinto from said source of pressure.

10. In a hydraulic brake, the combination of: a pair of brake cylinders; a master cylinder; a movable member connected to said master cylinder so as to actuate the same, said movable member, during the normal operation of the brake, being moved directly against the reaction of the fluid pressure in said master cylinder and being movable from a starting position to an end position; a pair of conduit means connecting said master cylinder with said brake cylinders; a source of fluid under pressure; means automatically operating to connect said source of fluid under pressure to said conduit means in response to movement of said movable member into said end position thereof; and means operating automatically in response to rupture of one of said conduit means to cut off the flow of the fluid thereinto from said source of pressure.

11. In a hydraulic brake, the combination of: a brake cylinder; a movable control member arranged so as to be moved from a starting position through a prescribed position to an end position; conduit means leading to said brake cylinder; mechanism operated by said control member as it is moved from said starting position toward said prescribed position to deliver fluid under pressure through said conduit means to said brake cylinder; a source of fluid pressure; and means automatically operating to disconnect said brake cylinder with respect to said mechanism and nect it to said source of fluid pressure when d movable member is moved into said end sition.

12. In a hydraulic brake, the combination of: pair of brake cylinders; a movable control mber arranged so as to be moved from a rting position to an end position; conduit ans leading to said brake cylinders; mechanism erated by said control member as it is moved m said starting position toward said end position to deliver fluid under pressure through said nduit means to said brake cylinders; a source fluid under pressure; and means operating tomatically to disconnect said mechanism with spect to said brake cylinders and connect said urce of fluid under pressure to said conduit ans in response to movement of said movable ember into said end position thereof.

13. In a hydraulic brake of the character described, the combination of: a pair of brake cylinders; a pair of conduit means leading respectively to said brake cylinders; a movable control member arranged so as to be moved from a arting position through a prescribed position an end position; means operated by said control member as it is moved from said starting position toward said prescribed position to deliver a st fluid under pressure through at least one said conduit means to at least one of said brake linders; a second source of fluid under pressure; and means operating in response to movement of said control member into said end position to cut off delivery of said first fluid under essure to at least one of said brake cylinders d to connect said second source of fluid pressure to at least one of said brake cylinders, whereby at least one of said brake cylinders will be tuated.

14. In a hydraulic brake of the character described, the combination of: a pair of brake cylinders; a pair of conduit means leading respectively to said brake cylinders; a movable control ember arranged so as to be moved from a arting position to an end position; means operated by said control member as it is moved from said starting position toward said end position to deliver a first fluid under pressure through at least one of said conduit means to at least one of said brake cylinders; a second source of fluid under pressure; and means operating in response to movement of said control member into said end position to cut off delivery of said first fluid under pressure to at least one of said brake cylinders and to connect said second source of fluid pressure to at least one of said brake cylinders, whereby at least one of said brake cylinders will be actuated.

15. In a hydraulic brake, the combination of: a plurality of brake cylinders; manually operable means for normally applying fluid under pressure to said brake cylinders; a source of fluid pressure; means actuated in response to the occurrence of decreased pressure in one of said brake cylinders to connect said brake cylinders with said source of fluid pressure; and automatic selector means operative to disconnect said one of said brake cylinders relative to said source of fluid pressure.

16. In a hydraulic brake, the combination of: a plurality of brake cylinders; manually operable means for normally applying fluid under pressure to said brake cylinders; a source of fluid pressure; means actuated in response to the occurrence of decreased pressure in one of said brake cylinders to connect said brake cylinders with said source of fluid pressure; and selector means responsive to said decrease of pressure in said one of said brake cylinders for disconnecting it with respect to said source of fluid pressure.

GUGLIELMO R. TREMOLADA.

REFERENCES CITED

The following references are of record in the file of this patent:

UNITED STATES PATENTS

| Number | Name | Date |
| --- | --- | --- |
| 1,650,286 | Livingston | Nov. 22, 1927 |
| 1,673,528 | Pigeolet | June 12, 1928 |
| 1,885,580 | Bradbury | Nov. 1, 1932 |